United States Patent
Söderqvist

[11] Patent Number: 5,862,594
[45] Date of Patent: Jan. 26, 1999

[54] SPLINTER SHIELD FOR USE WITH CIRCULAR TOOL

[75] Inventor: Magnus Söderqvist, Mölndal, Sweden

[73] Assignee: Aktiebolaget Electrolux (PUBL.), Stockholm, Sweden

[21] Appl. No.: 853,918

[22] Filed: May 9, 1997

[30] Foreign Application Priority Data

May 13, 1996 [SE] Sweden .................................. 9601846

[51] Int. Cl.⁶ .............................. B25F 1/02; B23D 45/16
[52] U.S. Cl. ................................................ 30/122; 30/391
[58] Field of Search ........................... 30/122, 388–391; 83/478

[56] References Cited

U.S. PATENT DOCUMENTS 4,809,438  3/1989  Nagashima et al. ...................... 30/390
5,074,179  12/1991  Omi .......................................... 83/478

*Primary Examiner*—Douglas D. Watts
*Attorney, Agent, or Firm*—Michael D. Bednarek; Kilpatrick Stockton LLP

[57] ABSTRACT

The invention relates to a splinter shield comprising a protective cover (20) for a substantially plane, circular tool, e.g. a cutting wheel (6), circular-saw blade or the like, which is rotatable about a rotation axis (31) and which, together with the splinter shield, can be fitted on a tool carrier (5) on a manually operated machine (1), which protective cover (20) is intended to house a section of the tool and has a through-running fixture hole (27) for the splinter shield on the side facing the tool carrier. What distinguishes the invention is that the side of the protective cover which contains the fixture hole is double-walled around the fixture hole, the walls (30, 60) in a region around the fixture hole being arranged at a distance (H) apart.

17 Claims, 8 Drawing Sheets

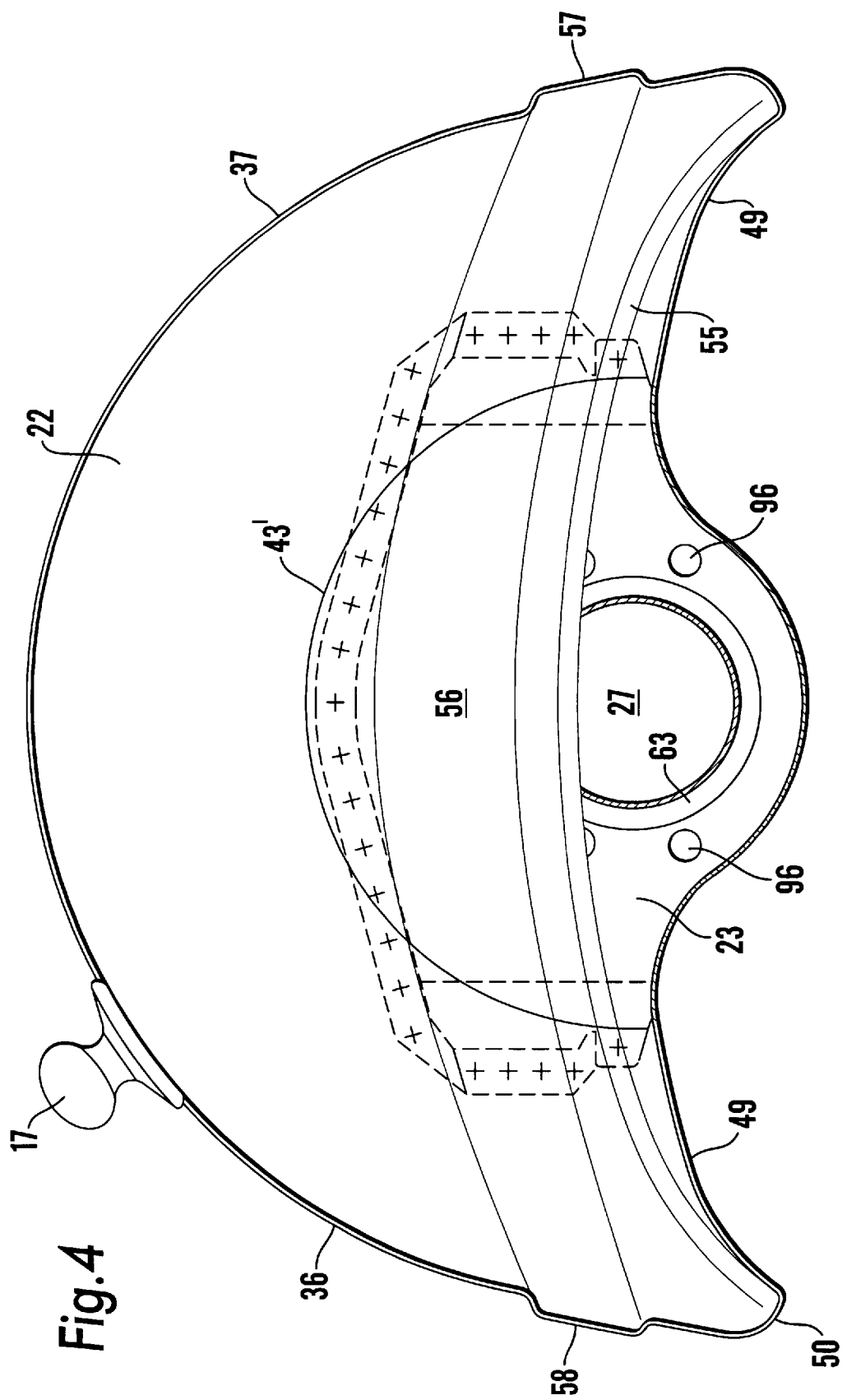

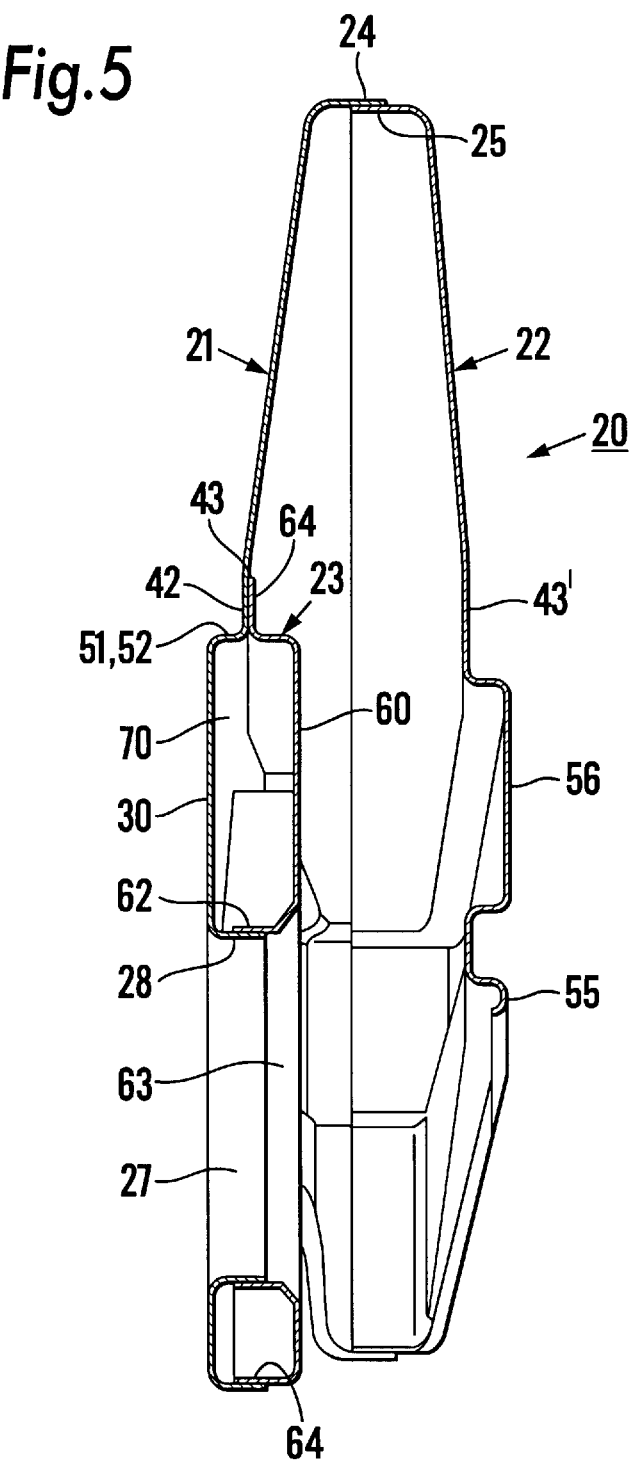

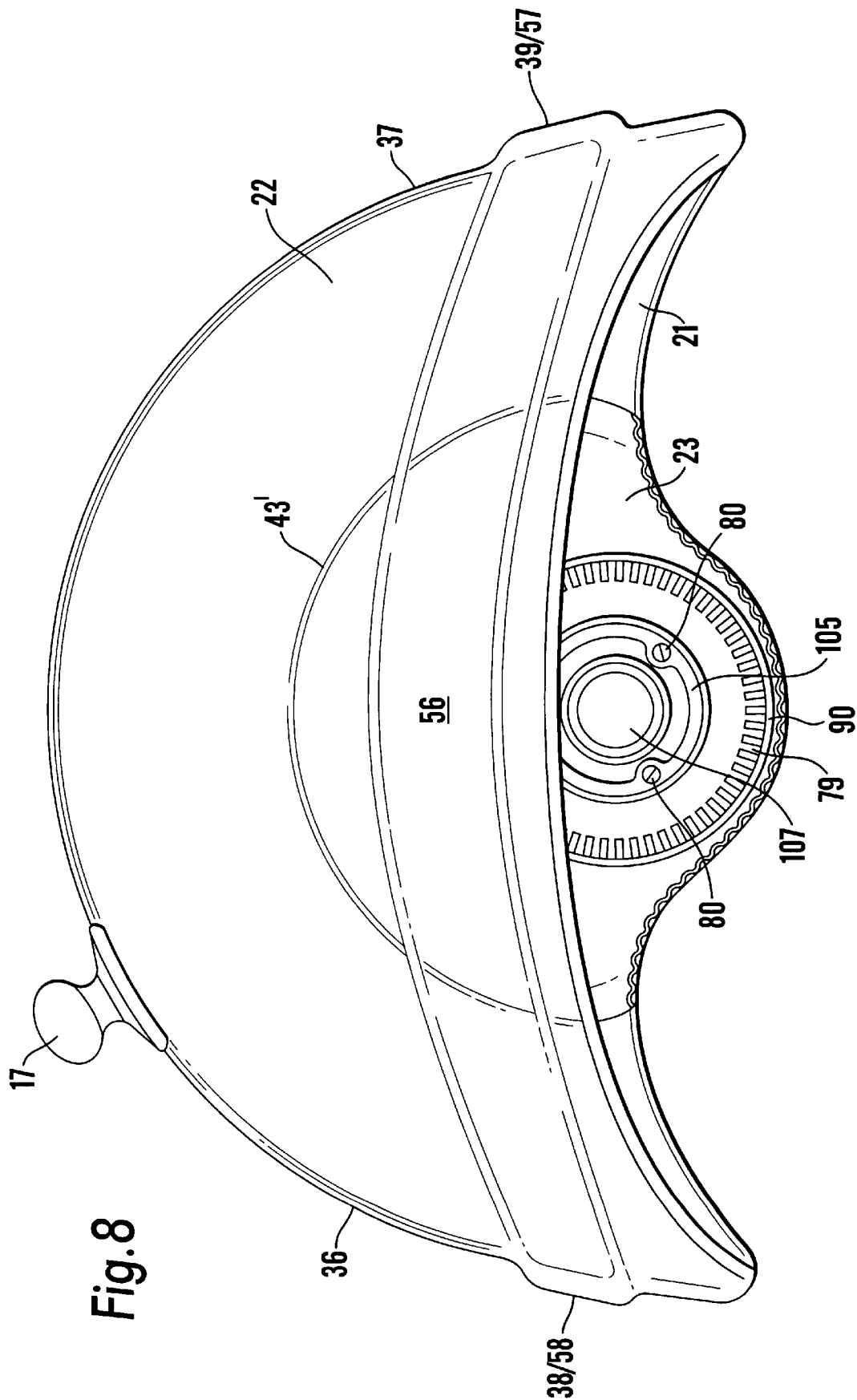

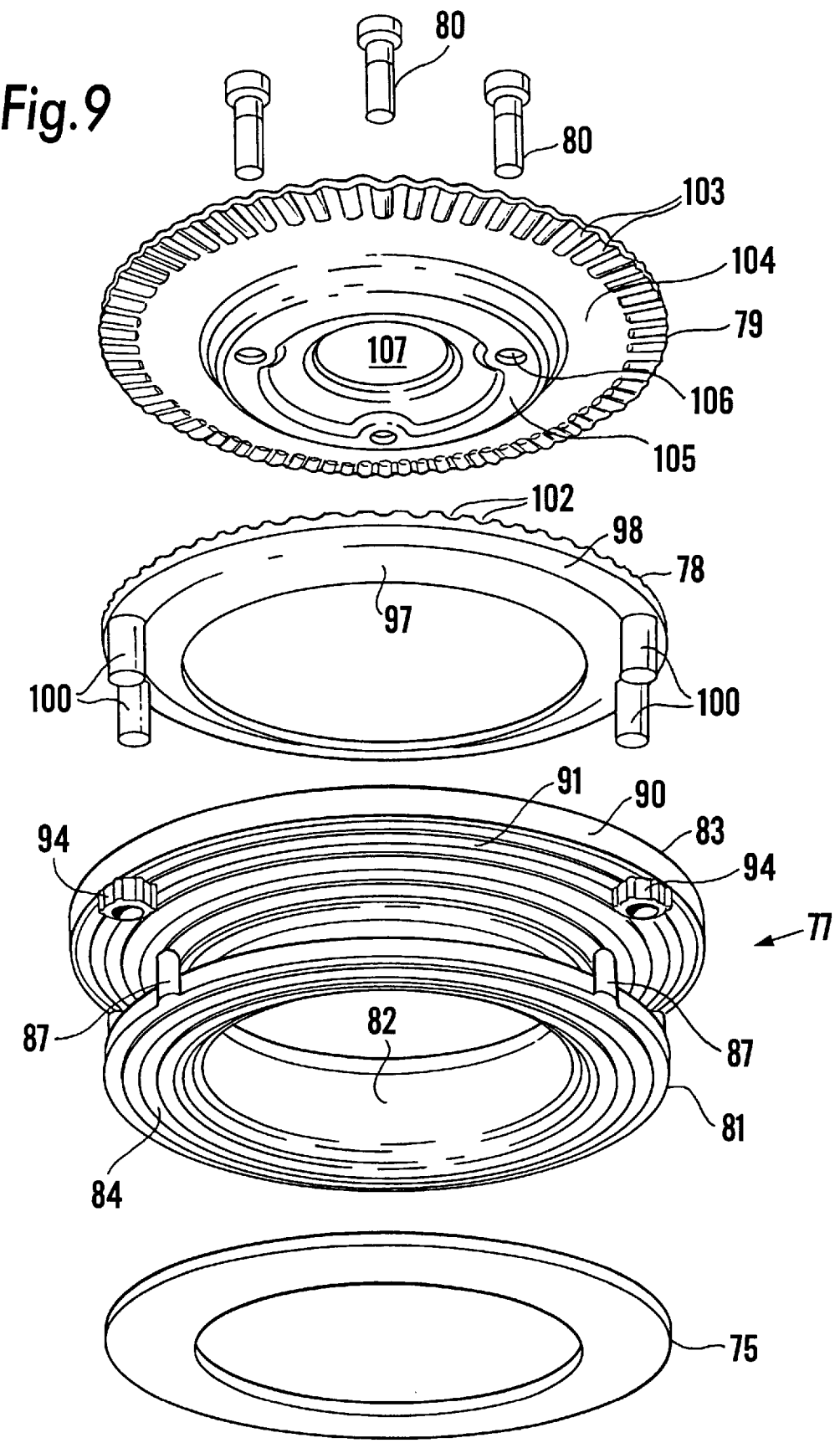

SPLINTER SHIELD FOR USE WITH CIRCULAR TOOL

TECHNICAL FIELD

The invention relates to a splinter shield (blade guard) for a substantially plane, circular tool, e.g. a cutting wheel, circular-saw blade or the like, which is rotatable about a rotation axis and which, together with the splinter shield, can be fitted on a tool carrier on a manually operated machine, which splinter shield comprises a cover which is intended to house a section of the tool and has a through-running fixture hole for the splinter shield in the one side of the splinter shield.

TECHNICAL ASPECT

Where machines are used having a splinter shield (also referred to as "blade guard") of the above-described type, vibrations are transmitted from the machine to the splinter shield via the tool carrier. These vibrations can be very strong; especially if the splinter shield cover has a natural frequency and resonance occurs between the vibrations of the machine and the natural oscillations of the splinter shield. Apart from the fact that vibrations in the splinter shield are bothersome for the user and are undesirable from an ergonomic viewpoint, they can also give rise to fatigue cracks or other structural damages. According to the prior art, this can be counteracted in various ways. For example, the mass of the splinter shield can be substantially increased, e.g. by making the material in the walls of the cover substantially thicker. This is not a good solution, since it implies a not insubstantial increase in the total weight of the machine. Another way of counteracting the vibrations is to stiffen the cover (the guard) by providing it with grooves or other embossments. A certain, but inadequate improvement could be thereby achieved. It is also known to provide the cover with internal and external stiffening members, which are screwed on or welded. Certain but inadequate improvements have also thereby been achieved. In addition, it is known to provide the cover with cast light-metal protection on the outside. This is however a relatively expensive solution. Such extra protection does not or not substantially provide a greater energy absorption capacity in the splinter shield, if the tool were to splinter during use. There is therefore a need for improvements which substantially reduce the vibration problem. At the same time, it is desirable that the improved splinter shield should also be able to allow greater engine power and/or the use of larger cutting wheels or corresponding tools without new vibration problems being thereby created.

BRIEF DISCLOSURE OF THE INVENTION

The object of the invention is to eliminate or at least substantially reduce the aforementioned vibration problems and at the same time to provide a splinter shield having a good splinter-protection effect. One aim of the invention is also to realize this without the total weight of the splinter shield becoming a problem. Yet another aim is to provide a splinter shield having a cover which can be given an aesthetically attractive appearance. It is also an aim to realize the said improvements without substantially adding to the cost of the splinter shield. A further aim is to provide a splinter shield in which members can be integrated so as to allow desired angular adjustment of the cover by rotating this about the rotation axis of the tool, whilst simultaneously preventing the cover from undesirably rotating "of its own accord" whilst the machine is in use.

These and other aims can be achieved or made possible by virtue of the invention being characterized by what is stated in the characterizing clause of claim 1 to follow. Further characteristics and aspects and advantages of the invention derive from the dependent claims and from the description of a preferred embodiment.

BRIEF DESCRIPTION OF THE DRAWINGS

The invention will be described in greater detail below with reference to the appended drawings, of which:

FIG. 4 shows the opposite, left side of the cover, FIG. 5 shows the cover in cross-section along a view V—V in FIG. 3, FIG. 8 shows the cover in the same view as in FIG. 4, but supplemented by fixture devices and combined rotational-adjustment and rotation-locking devices, and FIG. 9 represents an exploded view of the said fixture devices and combined rotational-adjustment and rotation-locking devices.

DESCRIPTION OF A PREFERRED EMBODIMENT

Figure 1:
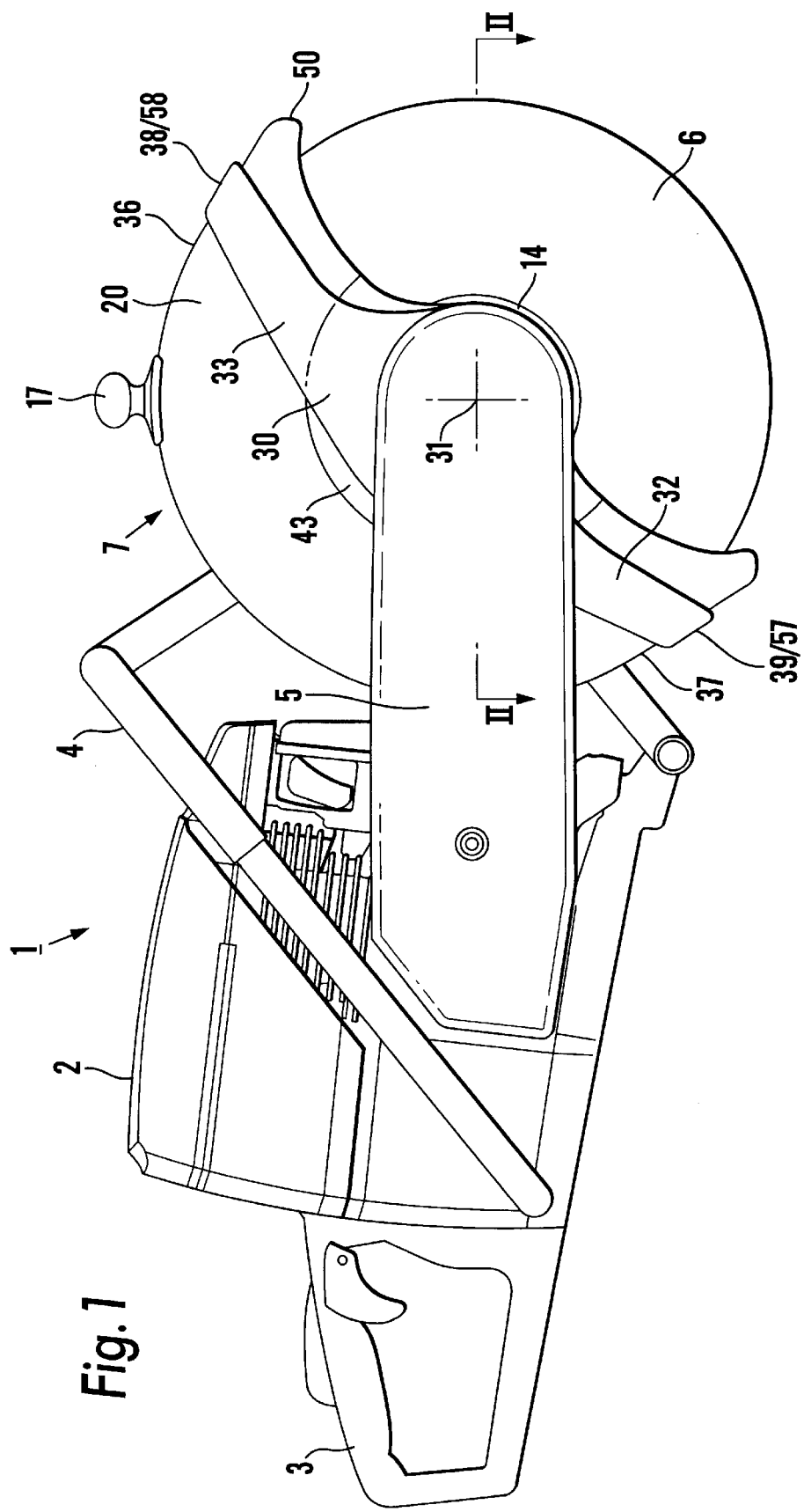
FIG. 1 represents a side view of a cutting machine having a splinter shield according to the invention.

With reference firstly to FIG. 1, a portable, manually operated, combustion-engine-driven working machine, more accurately a cutting machine, is denoted throughout by the numeral 1. Its main parts are constituted by a drive unit 2, a rear handle 3, a front handle 4, a tool carrier 5 (hereinafter referred to as a cutting arm), a cutting wheel 6 and a splinter shield 7. The cutting wheel 6 is driven via a drive belt 8, FIG. 2, which extends into the cutting arm 5 from the drive unit 2 to a front belt disc 9 having an axle 10 which is rotatable in a bearing 11 in a bearing housing 12, which is integrated with the cutting arm 5. The cutting wheel 6 is placed between a pair of flanged washers 13, 14 and clamped on the axle 10 by means of a nut 15.

The above belongs to the prior art. The innovatory aspect of the invention lies in the design of the splinter shield, which is denoted throughout by 7 and which comprises a protective cover 20. Also new is the way in which the protective cover 20 is fastened on the cutting arm 5, including the design of the fixture devices and rotational-adjustment and rotation-locking devices, which can be said to represent part of the integrated splinter shield 7.

The protective cover 20 consists of a relatively flat cover, which in axial views has the principal shape of a semicircle, sector of a circle or crescent and which is intended to house a section of the cutting wheel 6. It comprises a first, bearing cover half 21, which faces the cutting arm 5, and a second cover half 22 and a reinforcing plate 23. On the cover there is a handle 17, expediently made from plastic, which is used whenever it is wished to rotate the cover about the centre line 31 of the axle into a different angular position relative to the cutting arm 5. The cover halves 21 and 22 and the reinforcing plate 23 can consist, for example, of form-pressed sheet steel. The thickness of this is determined with regard to the size of the protective cover, but normally amounts to between 0.8 and 1.2 mm. Material other than sheet steel is also conceivable, e.g. aluminium, as well as combinations of different materials, e.g. combinations of sheet steel and aluminium. The two cover halves 21 and 22 have respective fold-over flanges 24 and 25 along their peripheral margin, arranged such that the bearing cover half 21 overlaps with its fold-over flange 24 the corresponding fold-over flange 25 outside the fold-over flange 25, in a manner which is known per se, FIGS. 2 and 5. The overlapping sections of the fold-over flanges 24, 25 are joined together by welding, when the material is sheet steel, for example. Other joining methods are also, of course, conceivable, such as riveting, especially when the material is aluminium or combinations of sheet steel and aluminium.

In the bearing cover half 21, there is a fixture hole 27, which is defined by a first, circular-cylindrical fold-in flange 28. The fixture hole 27 is formed in a pressed-out part of the bearing cover half 2 1. The pressed-out part comprises a plane wall section 30, which surrounds the fixture hole 27 and the plane of which is perpendicular to the centre line 30 of the fixture hole 27 and the axle 10 (which centre line simultaneously constitutes the centre of rotation of the cutting wheel 6) and a pair of plane, ridge-forming sections 32, 33, which extend from lines of curvature 34, 35 forward to and past the respective front 36 and rear edge 37 of the cover, so as then to be closed off by a front and a rear fold-over section 38, 39, which form projections on the respective front 36 and rear edge 37 of the cover. Also a section 40 in front of and below the elevated plane section 30, a section 41 behind and below the elevated plane section 30, and a section 42 above the elevated plane section 30, which sections 40, 41 and 42 are delimited by a circular arc 43, which coincides with the lines of curvature 34, 35, are level and parallel with the elevated plane section 30. Outside the circular arc 43, the wall of the cover half 21 slopes inward in the direction of the periphery. The second cover half 22, which will be described in greater detail below, has a correspondingly tapered shape, so that the cover 20 outside the said circular arc 43 exhibits in cross-section a tapered wedge shape, FIGS. 2 and 5.

The plane elevated section 30 of the bearing cover half21 comprises a relatively narrow section 45 below the fixture hole 27. The section 45 is delimited in its periphery by a fold-in flange 46, which extends along a circular arc between the points 47 and 48. From the point 47, the fold-in flange 46 continues in the form of an inner fold-in edge 49 onward to the front tip 50 of the cover half and in the form of a ridge slope 44 between the plane elevated section 30 and the plane wall section 40, which continues up to and including the projecting section 38. The rear part of the cover half is symmetrically designed in the same way. At the top, the plane elevated section 30 is delimited by a ridge slope 51, which extends from a crest 52 respectively forward and backward towards, and encompassing, the respective projecting sections 38 and 39.

The second cover half 22 has outside the circular-ring arc 43' (which coincides with the circular-ring arc 43) a shape which essentially corresponds to the shape belonging to the first cover half21. At a distance from the lower edge section 55 of the cover half21, which is bent over outwards and inwards, there extends an elevation in the form of a wide ridge 56, the summit of which in cross-section is totally straight and, inside the circular arc 43', level and parallel with the plane section 30 on the first cover half 21, over the whole of the cover half 22 up to and past the respective front and rear edges 36, 37 of the cover, so as to form there respective projections 57 and 58. The latter are designed such that they too, in the fitted cover 20, are inserted in the projections 38, 39 of the first cover half 21 in the same way as the folding flange 25 is inserted in the fold-in flange 24 of the first cover half In the fitted cover, the ridge 56 will in this way, via the projections 57 and 58, pass into corresponding projections 38, 39 on the first cover half 21 and thereafter continue with the ridge-forming sections 32 and 33 and finally join up with the plane elevated section 30. Together, the ridge 56, the projecting sections 38/58, 39/57, the ridge sections 32 and 33, as well as the plane elevated section 30 thus form a continuous elevation, which extends around the entire cover 20, i.e. including over the front 36 and rear edge 37 of the cover.

Figures 6, 7:
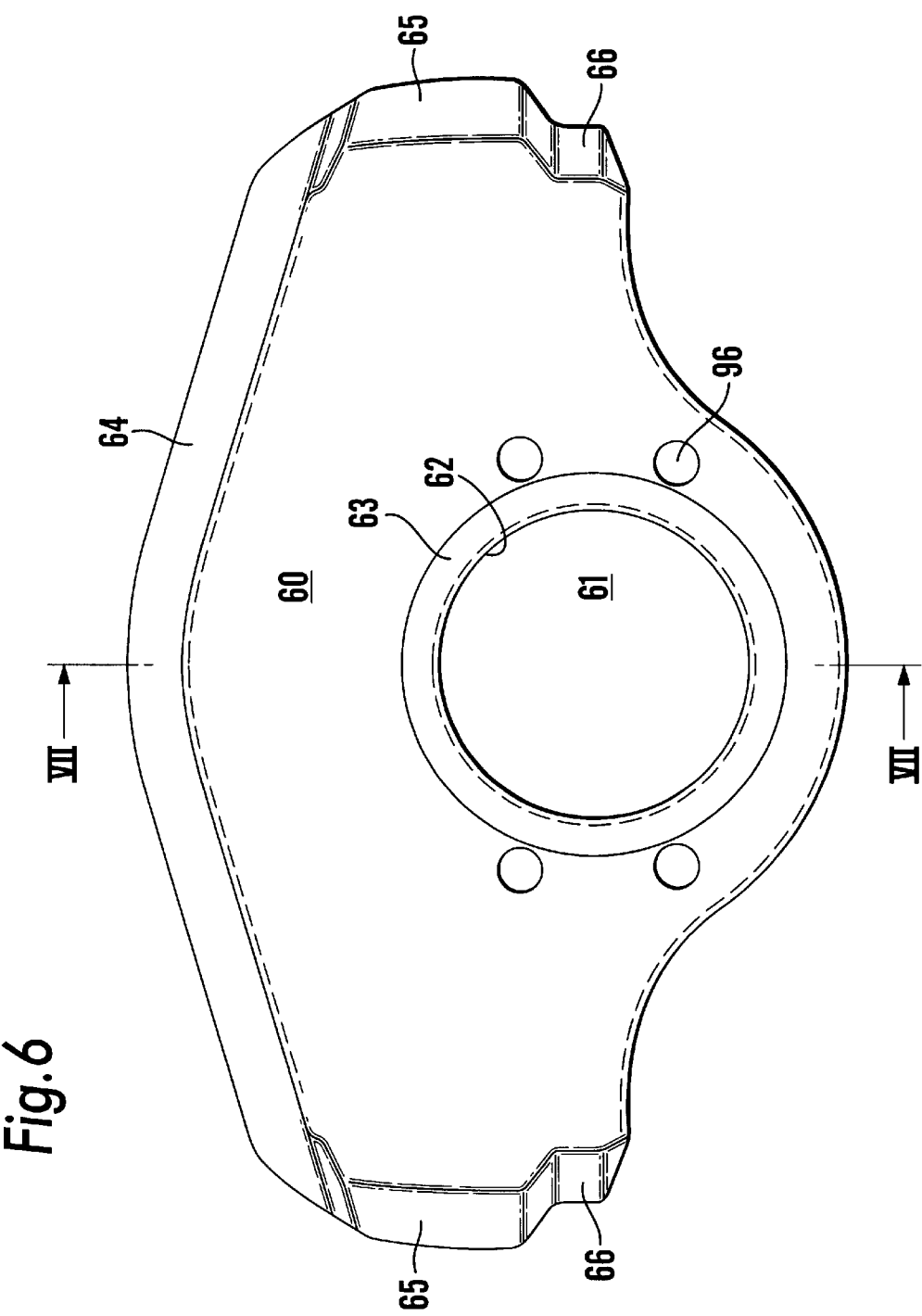
FIG. 6 represents a side view of a reinforcing plate which forms part of the cover and forms the one wall in a box construction forming part of the cover.
FIG. 7 shows the reinforcing plate in cross-section along a view VII—VII in FIG. 6.

The reinforcing plate 23, FIGS. 6 and 7, has a plane main part 60. A hole 61 is defined by a second circular-cylindrical fixture flange 62. When the reinforcing plate 23 is fitted in the cover 20 inside the bearing first cover half 21, the said second circular fold-in flange 62 bears against the outside of the first circular fold-in flange 28. Between the plane main part 60 of the reinforcing plate and the cylindrical fold-in flange 62 there is a circumferential conical section 63. The plane section 60 is surrounded by a lower fold-in flange 64 inside and along the lower fold-in flange 46 of the first cover half 61 and its continuation in the form of the front ridge slope 44 and corresponding rear ridge slope, respectively. In the upward direction, the plane section 60 is delimited by an inward-facing elongated lip 64, which bears against and is welded to the plane section 42 of the cover half41 above the elevation 30. In front and behind, the plane section 60 is delimited by lip sections 65 and 66 which are folded-in to different depths. The lip sections 65 are thus folded-in to a greater depth and are inserted in the slots which are formed on the inside of the cover half 21 in the regions for the elevated sections 32 and 33. The lip sections 65 are welded to the inside of the cover half 21 against the inside facing the said elevations 32 and 33. Correspondingly, the shorter lip sections 66 bear against and are welded against the inside of the cover 21 between the ridge sections 32, 33 and the lower edge of the cover 21. There is thereby formed around the fixture hole 21 a closed chamber 70, which extends around the fixture hole 27. The height H of the chamber 70 in the axial direction amounts, according to the embodiment, to approx. 15 mm, i.e. to more than 10 times the thickness of each wall or more than 5 times the combined thickness of the walls. The closed body which forms the chamber 70 can also be defined as a hollow-beam construction, more specifically as an annular hollow-beam construction, having plane walls 30, 60 around the cylindrical, substantially double-walled fixture hole 27. The construction can also be described such that the cover 20 is double-walled in a region around the fixture hole 27, with the two walls (which are formed by the plane wall sections 36, 60 on the cover half 21 and on the reinforcing plate 23, respectively) arranged at a distance H apart.

When welding together the protective cover 20, the reinforcing plate 23 is first fitted on the inside of the first cover half 21 and welded firmly in place to form the said circumferential hollow-beam construction with the said circumferential chamber 70 having plane parallel walls 30, 60. Thereafter, the cover half 22 is fitted in the bearing cover half21 and welded to this in the region for the fold-in flanges 24, 25 and also in the region for the overlapping projections 38/58 and 39/57. After finishing, the handle 17 is screwed tight.

The height H of the chamber 70, which can also be expressed as the thickness of the circumferential box girder construction or as the distance between the walls 30, 60, in the double-walled section within the region for the fixture of the protective cover 20, and the diameter of the fixture hole 27 are chosen such that they harmonize with the dimensions of the bearing housing 12 on the cutting arm 5 and with the fixture devices and rotational-adjustment and rotation-locking devices, as will be described below. The bearing housing 12 has a cylindrical section 72, which extends up from a flanged section 73 for a stretch approximately corresponding to the height H of the chamber 70 plus the thickness of the walls 30 and 60. In the flanged section 73 there is an annular slot 74 in which a plane plastic washer 75 is housed, see also FIG. 9. The cylindrical section 72 of the bearing housing has an outer diameter which is somewhat smaller than the diameter of the fixture hole 27, so that a gap 76 is formed between the cylindrical bearing housing section 72 and the said first circular fold-in flange 28, FIG. 2. The fixture devices additionally comprise a rubber sleeve 77, an inner locking washer 78 made from plastic, an outer locking washer 79 made from pressed sheet steel and fastening screws 80. The rubber sleeve 77 comprises an inner, outward-facing collar 81, a cylindrical section 82 and an outer, outward-facing collar 83. The inner collar 81 has on both sides annular slots 84, 85, arranged alternately, so that the outer slots 85 are arranged midway between the inner slots 84 and vice versa. In addition, the inner collar 81 is provided in its periphery with four upwardly directed protuberances 87, which are placed such that they can be introduced into corresponding holes 88, FIG. 3, in the plane wall section 30 of the bearing cover half 21, distributed around the fixture hole 27.

The outer collar 83 of the rubber sleeve 77 is somewhat wider than the inner collar 81. It is initially slightly conical, harmonizing with the conical surface 63 of the reinforcing plate 23, so as thereafter to level out and be closed off by a short, cylindrical flanged section 90. In addition, the plane section of the outer collar 83 is provided with inner and outer slots 91, 92, which are arranged alternately in the same way as the slots 84, 85 in the inner collar 81. The outer collar 83 further has four inward-facing, tubular protuberances 94, which are provided on the outside with a number of longitudinal projections. The pipes continue in the form of holes 95, which extend through the collar 83 close to the outer cylindrical flanged section. The tubular protuberances 94 are placed and dimensioned such that they can be pressed into corresponding holes 96 in the reinforcing plate 23, FIG. 6, which are also distributed around the fixture hole 27.

The plastic inner locking washer 78 has an inner, slightly conical section 97, which corresponds to a corresponding conical section on the outer collar 83 of the rubber sleeve, and outside this conical section 97 a section 98 which is plane on the inside and is provided with four inwardly directed protuberances 100, which are placed and dimensioned such that they can be pressed in through the holes 95 and further into the tubular protuberances 94 on the outer collar 83 of the rubber sleeve 77. In the fitted position, the plastic locking washer 78 comes to lie inserted in the rubber sleeve 77 inside its cylindrical flange 90. On the outside, the plastic inner locking washer 78 has gently rounded cogs 102, which form a ring adjacent to the outer edge of the washer. The cogs 102 thus form a ring, which extends in a wave pattern around the whole of the circumference of the washer 78.

The steel outer locking washer 79 has along its periphery a corresponding ring in the form of an embossed wave pattern with gently rounded cogs 103 of the same pitch and facing towards and arranged to interact with the cogs 102 on the plastic inner locking washer 78. Inside the cog ring thus formed, containing the cogs 103, the steel washer 79 has a conical section 104 harmonizing with the conical section 97 on the plastic inner locking washer 78 and also with corresponding conical sections of the rubber collar 83 and reinforcing plate 23, respectively. Inside its conical section 104, the outer locking washer 79 has a cupped section comprising an annular depression 105 with through holes 106 for the fastening screws 80, inside this depressed section an annular flanged section 106 and a central hole 107 for the axle 10 and for the centering bush 16 of the cutting wheel 6. In the bearing housing 12 there are threaded holes for the fastening screws 80. When the splinter shield is fitted, FIGS. 8 and 2, the outer locking washer 79 bears with its annular section 105 against the bearing housing 12.

Figure 2:
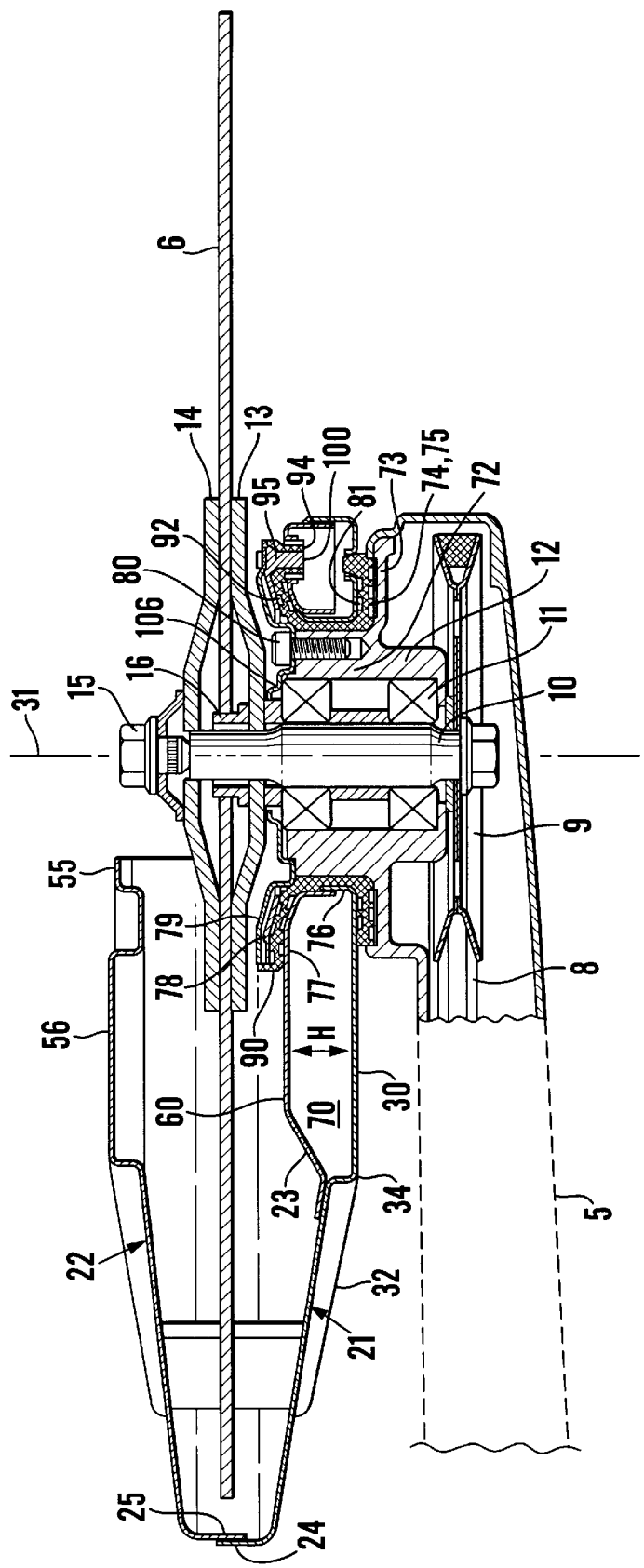
FIG. 2 shows the splinter shield, the cutting wheel and the fixture devices of the splinter shield and cutting wheel along a view II—II in FIG. 1.
Figure 3:
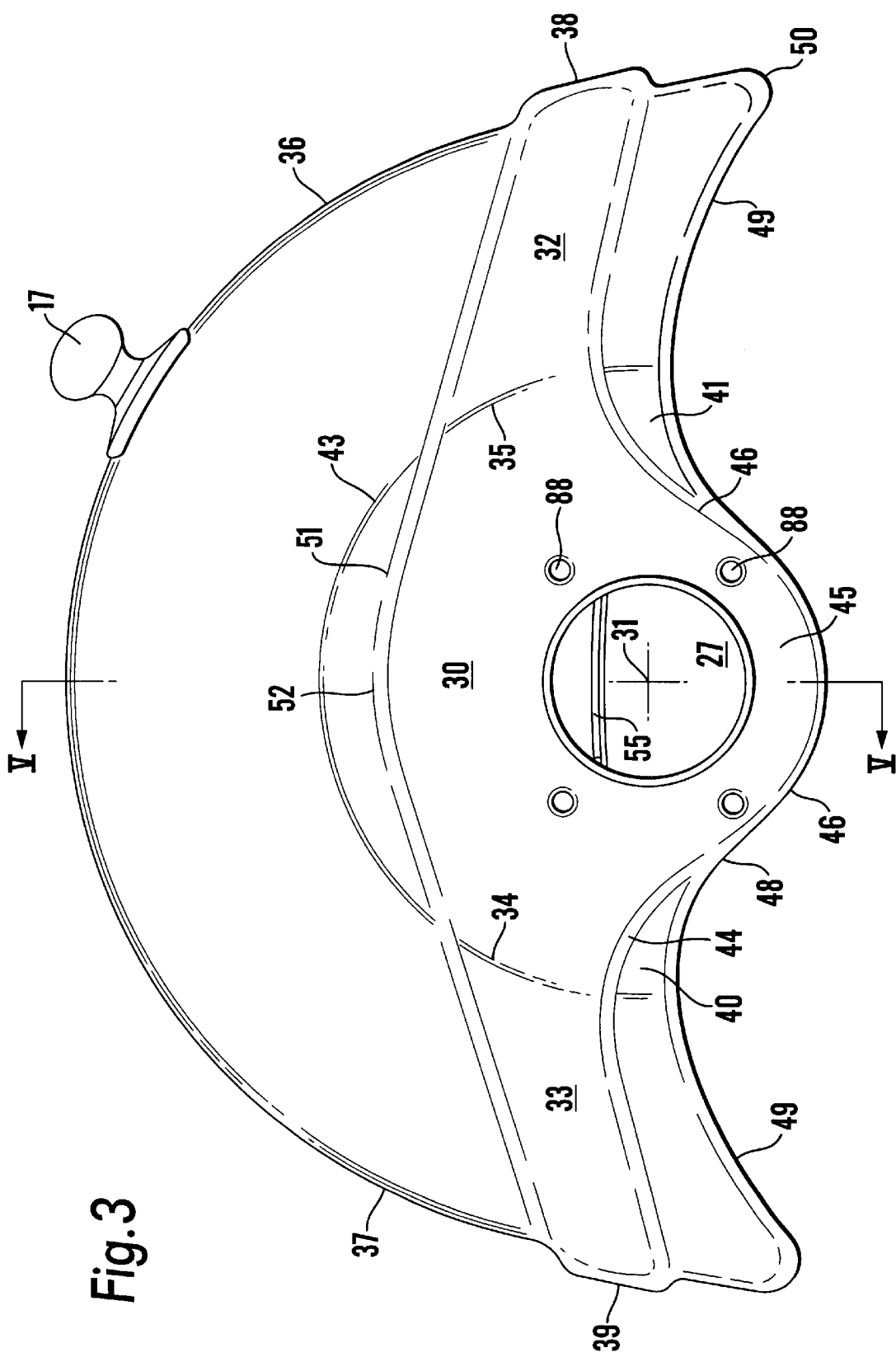
FIG. 3 shows that side of the splinter shield cover shown in FIG. 1 which faces the tool carrier of the machine, i.e. in the same view as in FIG. 1.

When fitting the rotational-adjustment devices and the splinter shield, the procedure is as follows. It is assumed that the cutting wheel 6 and all the other parts which in FIG. 2 are shown fitted on the cutting arm 5 are removed, with the exception of the V-belt 8, belt disc 9, axle 10, bearing 10 and wheel-centering bush 16. It is further assumed that the various parts of the protective cover 20 are joined together and that the cover is otherwise ready for fitting.

The plane plastic washer 75 is placed in the annular slot 74 in the flange 73 on the cutting arm 5. The plastic inner locking washer 78 is joined up with the rubber sleeve 77 by the protuberances 100 being pressed down into the holes 95 and into the tubular protuberances 94 on the rubber collar 83 and so that the bottom side of the washer 78 is brought into contact with the top side of the collar 83. The rubber sleeve 77 is subsequently squeezed firmly onto the protective cover 20 through the fixture hole 27, so that its inner collar 81 comes to bear with its top side against the bottom side of the plane section 30 around the fixture hole 27 and the outer collar 83 comes to bear against the conical surface 63 and against the plane surface 60 of the reinforcing plate 23 around the hole 61, FIG. 6. The rubber sleeve 77 is further dimensioned such that its cylindrical section 82 becomes pressed with its outside against the wall of the fixture hole 27. In addition, the protuberances 87 are brought into the holes 88, FIG. 3, on the plane section 30 of the protective cover and the tubular protuberances 94 on the rubber collar with the protuberances 100 on the inner locking washer 78 are brought into the holes 96 on the reinforcing plate 23, FIG. 6. Alternatively, the rubber collar can be squeezed in through the fixture hole 27 and the protuberances of the rubber collar are brought into the said holes before the inner locking washer 78 is joined up with its protuberances 100 in the rubber collar 83. The steel outer locking washer 79 is subsequently placed in position on the inner locking washer 78 with the cogs 102 and 103 on the two locking washers intermeshed. The next step is to place the protective cover 20 on the cutting arm 5, so that the rubber collar 77 is driven in on the cylindrical section 76 of the bearing holder 12 until the inner rubber collar 81 comes into contact with the plastic washer 75 in the slot 74. Finally, the fixture devices and rotational-adjustment and rotation-locking devices are fixed by means of the screws 80, the box girder construction, which defines the chamber 70, i.e. the double-walled section on the bearing cover half, becoming enclosed by the rubber sleeve 77 between the locking washers 78 and 79, on the one hand, and the flanged section 73 on the cutting arm 5, on the other hand, the two rubber collars 81 and 83 acting as resilient shims. Finally, the cutting wheel 6 is fitted on the axle 10 by means of the fastening washers 13, 14 and the nut 15, in a manner which is known per se.

Whilst the machine I is in use, vibrations are essentially prevented from occurring in the protective cover 20 or from being transferred to this from the machine. This is achieved through a combined set of special features belonging to the invention. Of great importance in this context is that the cover is double-walled in a circumferential region around the fixture hole and that the distance H between the two walls 30, 60 is substantial. According to the chosen embodiment, it amounts to 15 mm and should generally, in relation to the thickness of the material of the walls, amount to the measures which have been stated above and/or which are specified in the subsequent patent claims. Also of importance is that the said double-walled, circumferential box construction is clamped between resilient and/or flexible members, which, according to the embodiment, are constituted by collars and bellies on the rubber sleeve 77. Finally, the circumferential ridge which has been described above and which is partially integrated with the said box construction acts as a basic stiffening of the cover, significant importance probably being attached, in particular, to the protuberances 38/58 and 39/57 which are integrated with the circumferential ridge.

The screws 80 fix the outer locking washer 79 on the cutting arm 5. The locking washer 79 can therefore not be rotated about the rotation axis 31. As a result of mating between the cogs 102 and 103 on the locking washers 78 and 79, undesirable rotation of the protective cover 20 due to stresses during normal machine operation is prevented. On the other hand, it is possible to rotate the cover about the rotation axis 31 with manual force by pulling on the handle 17 on the cover 20 by virtue of the fact that the cogs 102 and 103 are rounded, thereby permitting priming as one or both of the rubber collars 81, 83 are simultaneously compressed, which rubber collars are provided for this purpose with the said annular slots 91, 92 and 84, 85, respectively. By means of this rotation, the rubber sleeve 77 is rotated with its cylindrical belly about the cylindrical section 72 of the bearing housing 12, at the same time as the inner collar 81 of the rubber sleeve slides against the plastic washer 75 in the slot 74.

The invention is not bound to the shown embodiment. Amongst conceivable modifications relating to the cover 20, it has already been mentioned that it can, of course, be made from material other than sheet steel, e.g. aluminium. In this case, it can and should be given greater material thickness and also the relationship between the distance H between the walls in the cavity and the material thickness can in this case be adapted to the thickness of the said alternative material or material combination. The outer distance between the walls 30, 60 in the double-walled, circumferential section around the fixture hole 27 should also in this case amount to no less than 7 mm, expediently no less than 9 mm, but the inner distance H can in this case be less than when the cover is made from sheet steel. Preferably, the inner distance H between the walls 30, 60 should in this case be no less than 5 mm, preferably in this case no less than 7 mm, expediently no less than 9 mm. It shall also be mentioned that the distance between the walls 30, 60 does not necessarily need to amount to the said measurements within the whole of the double-walled region, but that the said distances must be contained within at least some part of the double-walled region, preferably within that part which is clamped by the fixture devices around the fixture hole 27.

Amongst other conceivable modifications, it is important to mention that the reinforcing plate 23 can be given a different extent from that which is shown. For example, it can extend further out in a lateral direction towards the periphery of the cover within the region for the elevated sections 32, 33. A tested modification has thus proved to have very good stability, where the reinforcing plate 23 extended right out to the periphery of the cover. For further stabilization, it can also be imagined to let the reinforcing plate continue with a fold-over section towards the inside of the opposite side of the cover in the region of the projections 38/58 and 39/57. This latter variant can above all be suitable in respect of very large splinter shields. It is also possible for a section of the reinforcing plate 23 to extend up against the crest of the cover 20, so that the reinforcing plate 23 in plan view acquires the principal shape of an up turned and down turned T. The distance between the cover half 21 and the reinforcing plate 23 herein diminishes in the sections which extend out towards the front and rear edge of the cover and/or towards its top from the central section around the fixture hole 27, so that the cutting wheel 6 can travel freely in the cover with a healthy margin.

The chamber 70 is normally empty. As a further modification, mention must however be made of the possibility of filling the chamber 70 with foamed plastic, expediently after the cover 20 has been welded together, e.g. through an injection hole on the inside of the cover within the region of the reinforcing plate 23. The aim of such filling would be to increase further the vibration-damping capacity of the chamber 70 with only a marginal increase in the total weight of the protective cover.

I claim:

1. A splinter shield for use in an engine-driven machine having a tool carrier that supports a rotary tool for rotation about a rotation axis (31), the splinter shield comprising a protective cover (20) having two sides that house a section of the tool, one of the two sides facing the tool carrier, the protective cover further comprising a through-running fixture hole (27) for the splinter shield on the side facing the tool carrier, wherein the side of the protective cover which contains the fixture hole has two spaced walls (30, 60) around the fixture hole, the walls (30, 60) in a region around the fixture hole being arranged at a distance (H) apart, and the walls being welded together to form a hollow-beam unit composed of members which are permanently secured to each other and having a chamber (70) therein, surrounding the fixture hole.

2. Splinter shield according to claim 1, wherein the distance between the outsides of the walls (30, 60) in the double-walled region is no less than 7 mm within at least some part thereof.

3. Splinter shield according to claim 2, wherein the distance (H) between the insides of the walls in the double-walled region is no less than 5 mm within some part thereof.

4. Splinter shield according to claim 1, wherein the distance between the outsides of the walls and preferably also between the insides of the walls is no less than 5 times as large as the combined thickness of the double walls (30, 60), where the walls consist of sheet steel.

5. Splinter shield according to claim 1, wherein the distance between the outsides of the walls and preferably also the insides of the walls is no less than twice as large, preferably no less than 4 times as large as the combined thickness of the double walls, where the walls consist of aluminum plate.

6. Splinter shield according to claim 1, wherein the distance between the outsides of the walls and preferably also the distance between the insides of the walls is no less than 10 times as large as the thickness of the smallest of the said walls (30, 60) within at least some part of the double-walled region, where the walls consist of sheet steel.

7. Splinter shield according to claim 6, wherein the box construction forms a chamber (70) which is no less than substantially closed and surrounds the fixture hole, and that it extends at least half-way towards the front and rear edges (36, 37) of the cover measured from the center of the fixture hole.

8. Splinter shield according to claim 1, wherein the space (70) between the walls (30, 60) in the double-walled region is empty.

9. Splinter shield according to claim 1, wherein the space between the walls (30, 60) in the double-walled region is filled with a vibration-damping substance.

10. Splinter shield according to claim 1, wherein the protective cover (20) is clamped between fixture members, which enclose no less than one section of the double-walled region up to the fixture hole (27), and in that the distance between the insides of the walls in the double-walled region which is enclosed by the fixture members is no less than 5 mm, preferably no less than 7 mm.

11. Splinter shield according to claim 10, wherein resilient and/or flexible members bear against the outside of the walls defining the said double-walled region.

12. Splinter shield according to claim 11, wherein the said flexible members are formed by a rubber collar which is squeezed into the fixture hole and has sections which bear on the outside of the walls (30, 60) forming the said double-walled region.

13. A splinter shield for use in an engine-driven machine having a tool carrier that supports a rotary tool for rotation about a rotation axis (31), the splinter shield comprising a protective cover (20) having two sides that house a section of the tool, one of the two sides facing the tool carrier, the protective cover further comprising a through-running fixture hole (27) for the splinter shield on the side facing the tool carrier, wherein the side of the protective cover which contains the fixture hole has two spaced walls (30, 60) around the fixture hole, the walls (30, 60) in a region around the fixture hole being arranged at a distance (H) apart, and the walls being welded together to form a hollow-beam unit composed of members which are permanently secured to each other and having a chamber (70) therein, surrounding the fixture hole, the inner wall of said hollow-beam unit defining the wall of the fixture bole.

14. Splinter shield according to claim 13, wherein the hollow-beam unit defining the wall of the fixture is entirely separated from the tool carrier by a vibration-damping substance so that tool carrier vibrations are damped by the vibration-damping substance before reaching the hollow-beam unit.

15. Splinter shield according to claim 13, wherein the protective cover (20) is clamped between fixture members, which enclose no less than one section of the double-walled region up to the fixture hole (27), and in that the distance between the insides of the walls in the double-walled region which is enclosed by the fixture members is no less than 5 mm, preferably no less than 7 mm.

16. Splinter shield according to claim 15, wherein resilient and/or flexible members bear against the outside of the walls defining the said double-walled region.

17. Splinter shield according to claim 16, wherein the said flexible members are formed by a rubber collar which is squeezed into the fixture hole and has sections which bear on the outside of the walls (30, 60) forming the said double-walled region.

* * * * *